United States Patent
Hino (10) Patent No.: US 9,983,405 B2
(45) Date of Patent: May 29, 2018

(54) OPTICAL DEVICE AND IMAGE DISPLAY APPARATUS

(71) Applicant: Seiko Epson Corporation, Tokyo (JP)

(72) Inventor: Makiko Hino, Matsumoto (JP)

(73) Assignee: Seiko Epson Corporation (JP)

( * ) Notice: Subject to any disclaimer, the term of this patent is extended or adjusted under 35 U.S.C. 154(b) by 0 days. days.

(21) Appl. No.: 15/355,612

(22) Filed: Nov. 18, 2016

(65) Prior Publication Data

US 2017/0153444 A1 Jun. 1, 2017

(30) Foreign Application Priority Data

Nov. 27, 2015 (JP) .................................. 2015-231414

(51) Int. Cl.
*G02B 26/08* (2006.01)
*H04N 9/31* (2006.01)
*G03B 21/00* (2006.01)
*G03B 21/14* (2006.01)

(52) U.S. Cl.
CPC ....... *G02B 26/0875* (2013.01); *G03B 21/006* (2013.01); *G03B 21/14* (2013.01); *H04N 9/3188* (2013.01)

(58) Field of Classification Search
CPC .. G02B 26/085; G02B 26/0875; G03B 21/00; H04N 9/3188
USPC ......... 359/198.1–199.4, 200.6–200.8, 221.2, 359/223.1–226.2
See application file for complete search history.

(56) References Cited

U.S. PATENT DOCUMENTS

2013/0301100 A1* 11/2013 Mizoguchi ......... G02B 26/0816
  359/221.2
2016/0124216 A1* 5/2016 Kojima ............... G02B 26/0816
  359/199.3

FOREIGN PATENT DOCUMENTS

JP  2005-122021 A  5/2005
JP  2011-158589 A  8/2011

* cited by examiner

*Primary Examiner* — James Phan
(74) *Attorney, Agent, or Firm* — Harness, Dickey & Pierce, P.L.C.

(57) ABSTRACT

An optical device includes: an optical portion that has a light incident face onto which light is incident; a movable portion that is swingable while supporting the optical portion; a shaft portion that supports the movable portion so as to swing the movable portion around a swing axis; and a supporting portion that supports the shaft portion. The supporting portion has a rib structure which is formed by connecting ribs. The rib structure is provided on a single surface of the supporting portion.

20 Claims, 7 Drawing Sheets

OPTICAL DEVICE AND IMAGE DISPLAY APPARATUS

BACKGROUND

1. Technical Field

The present invention relates to an optical device and an image display apparatus having the optical device.

2. Related Art

In the related art, there have been known image display apparatuses (such as a projector) that cause a light modulation device (such as a liquid crystal display element) to modulate light, which is emitted from a light source, on the basis of image information and cause a projection optical device to project the light in an enlarged manner. Nowadays, there has been a demand for an increase in resolution of the image display apparatuses.

There have been optical devices as optical devices capable of achieving high resolution. The optical device deflects an optical path of image light which is emitted from the light modulation device by rotating (swinging) an optical portion (such as a glass plate) about a shaft, and virtually increases a resolution.

Currently, by reducing a weight of the optical device, reduction in weight of the image display apparatus is achieved.

JP-A-2011-158589 discloses an optical path control device that is configured such that an optical path changing plate (corresponding to the optical portion) supported by two leaf springs (corresponding to the shaft) is prevented from vibrating except for vibration caused by rotation for changing the optical path.

In JP-A-2011-158589, a holding member, which holds the optical path changing plate, is formed in a rectangular parallelepiped shape that surrounds the optical path changing plate. Further, two supporting bases, to which the ends of the leaf springs which are not connected to the holding member are connected, are formed in a rectangular parallelepiped shape. Thereby, in JP-A-2011-158589, reduction in weight thereof is not considered.

Accordingly, there have been demands for an optical device capable of achieving reduction in weight and ensuring rigidity and an image display apparatus having the optical device.

SUMMARY

An advantage of some aspects of the invention is to solve at least a part of the problems described above and the invention can be implemented as the following forms or application examples.

Application Example 1

An optical device according to this application example includes: an optical portion that has a light incident face onto which light is incident; a movable portion that is swingable while supporting the optical portion; a shaft portion that supports the movable portion so as to swing the movable portion around a swing axis; and a supporting portion that supports the shaft portion. The supporting portion has a rib structure which is formed by connecting ribs.

The supporting portion is a member that swings (vibrates) the optical portion, the movable portion, and the shaft portion while holding those, and thus rigidity is necessary therefor. Hence, normally, rigidity tends to be ensured by increasing the thickness of the supporting portion and making the supporting portion as a rigid body. For this reason, it is difficult to reduce a weight thereof. However, according to such an optical device, the supporting portion has a rib structure. Thereby, even when the thickness thereof increases, it is possible to achieve reduction in weight, and it is possible to ensure rigidity. Accordingly, the supporting portion can be formed with a thickness that increases rigidity by using the rib structure. As a result, it is possible to realize an optical device capable of achieving reduction in weight and capable of ensuring rigidity.

Application Example 2

In the optical device according to the application example, it is preferable that the rib structure is provided on a single surface of the supporting portion.

According to such an optical device, the rib structure is provided on the single surface of the supporting portion, and thus it is possible to achieve reduction in weight, and it is possible to ensure rigidity. Further, for example, in a case of using injection molding when forming the supporting portion, it is possible to improve moldability and the mold structure of the mold.

Application Example 3

In the optical device according to the application example, it is preferable that the rib structure is provided on both surfaces of the supporting portion.

According to such an optical device, the rib structure is provided on both surfaces of the supporting portion, and thus it is possible to achieve reduction in weight, and it is possible to ensure rigidity.

Application Example 4

In the optical device according to the application example, it is preferable that the rib structure is formed such that a distance between ribs in a region, in which the shaft portion of the supporting portion is supported, is shorter than a distance between ribs in the other region of the supporting portion.

According to such an optical device, the rib structure is formed such that the distance between ribs in a region, in which the shaft portion of the supporting portion is supported, is shorter than the distance between ribs in the other region of the supporting portion. Thus, compared with the other region, it is possible to improve rigidity, and it is possible to ensure rigidity of main portions for swinging.

Application Example 5

In the optical device according to the application example, it is preferable that the movable portion, the shaft portion, and the supporting portion are formed as one body so as to include a synthetic resin material.

According to such an optical device, the movable portion, the shaft portion, and the supporting portion are formed as one body so as to include the synthetic resin material, and thus it is possible to achieve reduction in weight, and it is possible to ensure rigidity. Further, since it is possible to perform molding in the injection molding method, it is possible to improve mass-production capability. Further, since the supporting portion has the rib structure, it is possible to prevents defects such as shrinkage from being caused by molding, and it is possible to improve molding quality.

Application Example 6

In the optical device according to the application example, it is preferable that the optical device further includes: a permanent magnet that is provided on the movable portion; a coil that generates magnetic field to act on the permanent magnet; and a coil supporting portion that supports the coil, and the coil supporting portion supports the permanent magnet by making the coil face the permanent magnet, and is fixed onto the supporting portion.

According to such an optical device, it is possible to smoothly swing the movable portion.

Application Example 7

In the optical device according to the application example, it is preferable that the optical portion transmits the light.

According to such an optical device, by using refraction (deflection) of the optical portion, it is possible to shift the optical axis of the light.

Application Example 8

An image display apparatus according to this application example include the optical device according to any one of the application examples described above.

According to such an image display apparatus, it is possible to achieve reduction in weight, and the image display apparatus has excellent display characteristics.

Application Example 9

In the image display apparatus according to the application example, it is preferable that by deflecting an optical path of light incident onto the optical device, positions of pixels displayed through irradiation of the light are shifted.

According to such an image display apparatus, it is possible to virtually improve resolution.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

In the present embodiment, an optical device 2, and an image display apparatus having the optical device 2 will be described with reference to accompanying drawings.

Figure 1:
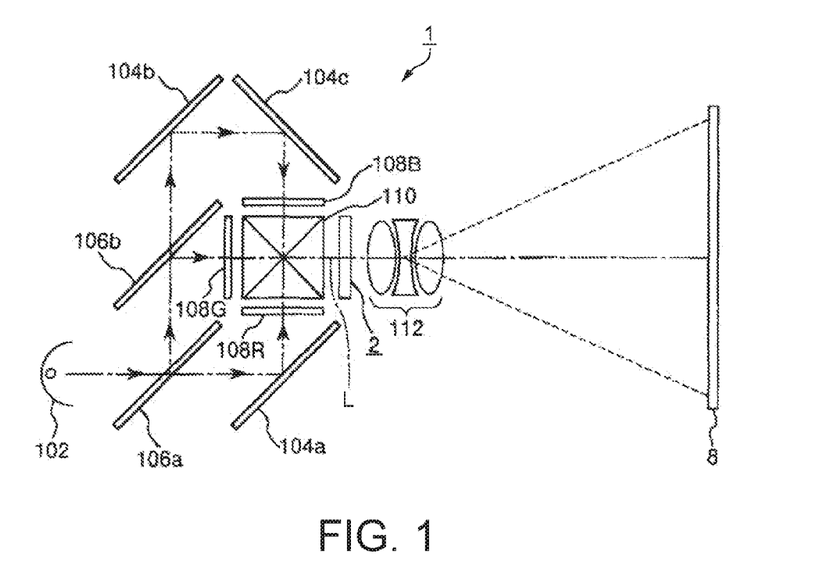
FIG. 1 is a schematic diagram illustrating an optical configuration of an image display apparatus according to a first embodiment.
Figure 2:
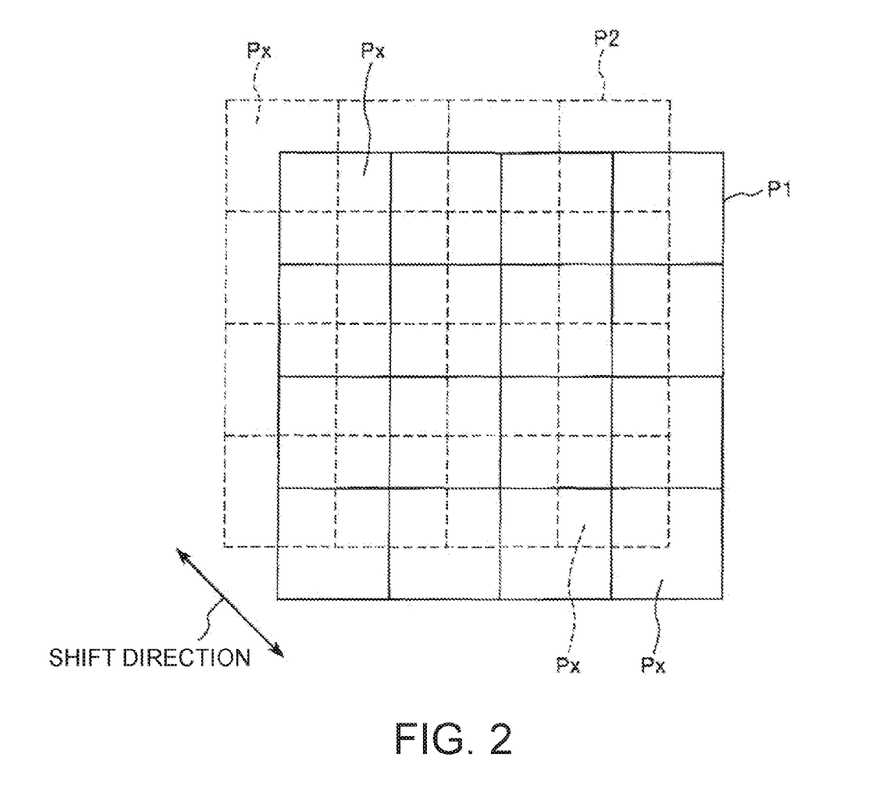
FIG. 2 is a schematic diagram illustrating a situation where image light is shifted.
Figure 3:
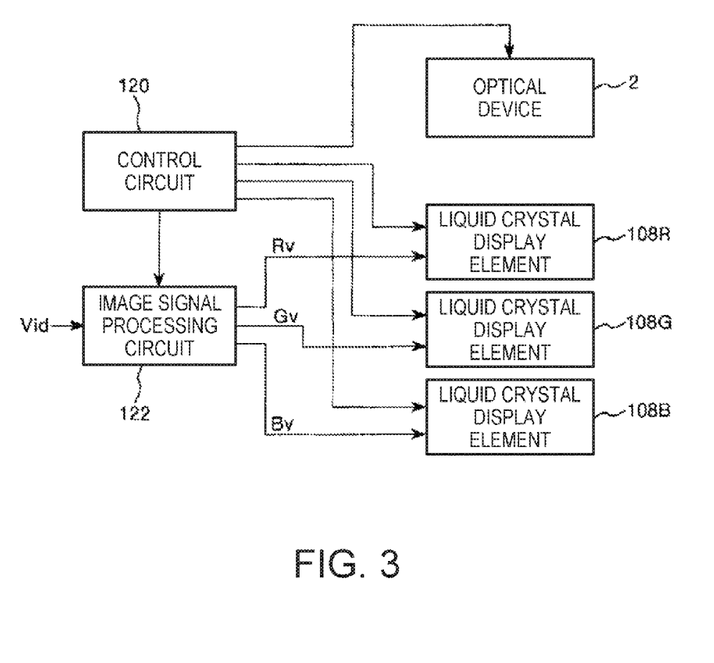
FIG. 3 is a block diagram illustrating an electrical configuration of the image display apparatus.

FIG. 1 is a schematic diagram illustrating an optical configuration of an image display apparatus according to a first embodiment. FIG. 2 is a schematic diagram illustrating a situation where image light L is shifted. FIG. 3 is a block diagram illustrating an electrical configuration of the image display apparatus. In the present embodiment, the optical device 2 is applied to a projector 1 as the image display apparatus.

As shown in FIG. 1, the projector 1 as the image display apparatus is an LCD-type projector, and includes a light source 102, mirrors 104a, 104b, and 104c, dichroic mirrors 106a and 106b, liquid crystal display elements 108R, 108G, and 108B, a dichroic prism 110, an optical device 2 as an optical path deflection element, a projection optical device 112, and the like.

Optical operations of the projector 1 will be briefly described.

As the light source 102, for example, it is possible to use a halogen lamp, a mercury lamp, a light emitting diode (LED), or the like. Further, as the light source 102, a light source that emits white light is used. The light, which is emitted from the light source 102, is separated into red light (R) and the other light through the dichroic mirror 106a. The red light is reflected by the mirror 104a, and is thereafter incident onto the liquid crystal display element 108R, and the other light is separated into green light (G) and blue light (B) through the dichroic mirror 106b. Then, the green light is incident onto the liquid crystal display element 108G, and the blue light is reflected by the mirrors 104b and 104c, and is thereafter incident onto the liquid crystal display element 108B.

The liquid crystal display elements 108R, 108G, and 108B are respectively used as the light modulation devices. The liquid crystal display elements 108R, 108G, and 108B are transmissive-type light modulation devices respectively corresponding to primary colors of R, G, and B, and include, for example, pixels which are arranged in a matrix shape with 1080 rows arranged vertically and 1920 columns arranged horizontally. In each pixel, a light amount of transmitted light of incident light is adjusted, and distribution of light amounts of all the pixels is integrally controlled in the liquid crystal display elements 108R, 108G, and 108B. Light beams, which are respectively spatially modulated by the liquid crystal display elements 108R, 108G, and 108B, are synthesized through dichroic prism 110, and image light L with full colors is emitted from the dichroic prism 110. The emitted image light L is enlarged through the projection optical device 112, and is projected onto a screen 8 or the like.

The projector 1 includes an optical device 2 that is provided between the dichroic prism 110 and the projection optical device 112. The projector 1 shifts positions of pixels to be projected by shifting the optical axis of the image light L through the optical device 2, and is able to project an image with a resolution (4K if the liquid crystal display elements 108R, 108G, and 108B are full HD) higher than resolutions of the liquid crystal display elements 108R, 108G, and 108B onto the screen 8.

A principle of shifting the optical axis of the image light L will be briefly described.

The optical device 2 includes a glass plate 21 (refer to FIG. 4) that transmits the image light L, and changes the posture of the glass plate 21 by swinging the glass plate 21, and is able to shift the optical axis of the image light L using refraction.

As shown in FIG. 2, the projector 1 performs control such that an image display position P1 in a case of shifting the optical axis of the image light L in one direction is deviated from an image display position P2 in a case of shifting the optical axis of the image light L in the other direction, by an amount of a half of a pixel (that is, a half of a pixel Px), on the screen 8, in an inclination direction (an arrow direction of FIG. 2), through shifting of the optical axis performed by the optical device 2. Then, the projector 1 alternately displays images between the image display positions P1 and P2, apparently (virtually) increases the number of pixels, and achieves an increase in resolution of the image projected onto the screen 8. It should be noted that an amount of deviation between the image display positions P1 and P2 is not limited to an amount of a half of pixel, and for example, may be ¼ of a pixel Px, may be ¾ thereof.

The projector 1 of the present embodiment includes not only the optical device 2 and the liquid crystal display elements 108R, 108G, and 108B but also, as shown in FIG. 3, a control circuit 120 and an image signal processing circuit 122. The control circuit 120 controls an operation for recording a data signal to the liquid crystal display elements 108R, 108G, and 108B, an optical path deflection operation in the optical device 2, and an operation for generating a data signal in the image signal processing circuit 122. On the other hand, the image signal processing circuit 122 separates an image signal Vid, which is supplied from an external device not shown in the drawing, in accordance with 3 primary colors of R, G, and B, and converts the signal into data signals Rv, Gv, and Bv appropriate for the respective operations of the liquid crystal display elements 108R, 108G, and 108B. The converted data signals Rv, Gv, and Bv are respectively supplied to the liquid crystal display elements 108R, 108G, and 108B, and the liquid crystal display elements 108R, 108G, and 108B perform operations on the basis of the signals.

Figure 4:
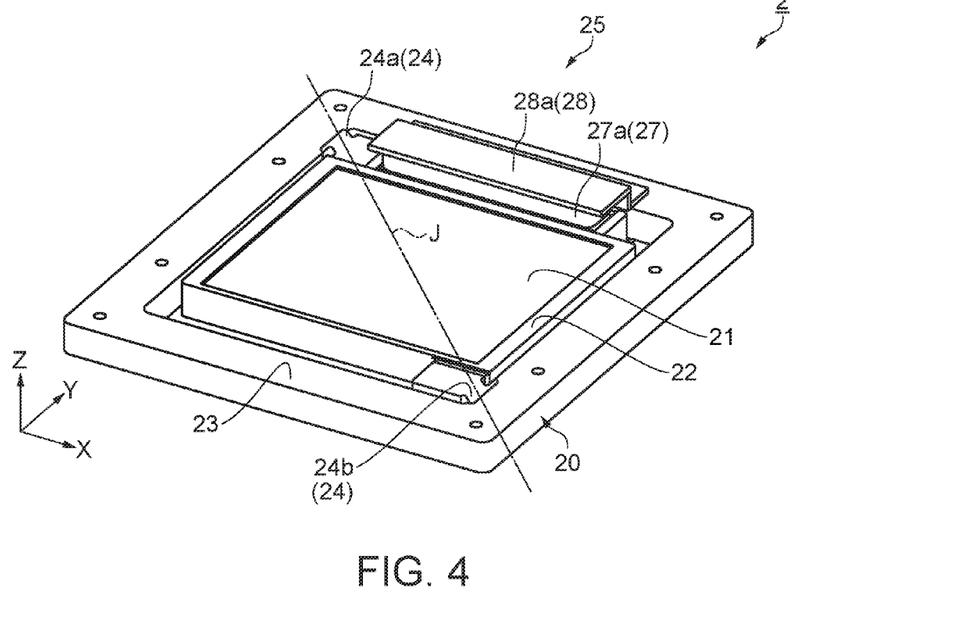
FIG. 4 is a perspective view illustrating an upper side of an optical device provided in a projector.
Figure 5:
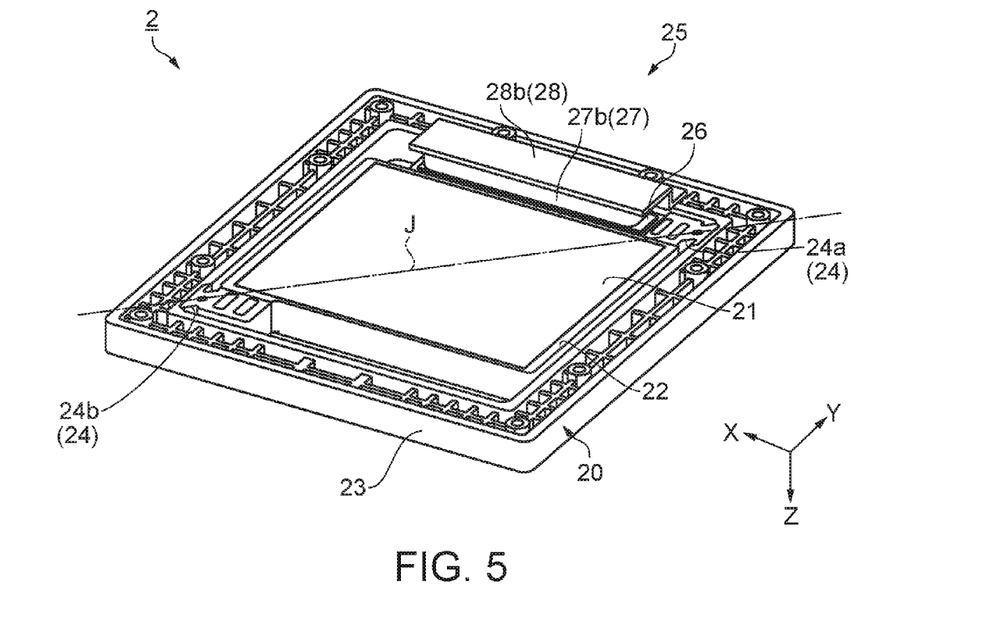
FIG. 5 is a perspective view illustrating a lower side of the optical device provided in the projector.

FIG. 4 is a perspective view illustrating an upper side of the optical device 2 provided in the projector 1. FIG. 5 is a perspective view illustrating a lower side of the optical device 2 provided in the projector 1. It should be noted that, in FIG. 4 and the following drawings, for convenience of description, an XYZ orthogonal coordinate system is used. Hereinafter, a direction, which is parallel with the X axis, is referred to as the "X axis direction", a direction, which is parallel with the Y axis, is referred to as the "Y axis direction", and a direction, which is parallel with the Z axis, is referred to as the "Z axis direction". The +Z axis side is referred to as the "upper side", and the −Z axis side is referred to as the "lower side". In addition, the X axis is in the horizontal direction of the supporting portion 23 in FIG. 4, the Y axis is orthogonal to the X axis, and is in the vertical direction of the supporting portion 23, and the Z axis is orthogonal to the X axis and the Y axis, and is in the thickness direction of the supporting portion 23. Hereinafter, "the plan view" means a case where the optical device 2 is viewed from the Z axis direction.

A configuration and operations of the optical device 2 will be described in detail.

As shown in FIGS. 4 and 5, the optical device 2 includes: a glass plate 21 as the optical portion that has optical transparency and deflects and emits the incident image light L; a movable portion 22 that is swingable while supporting (housing) the glass plate 21; a pair of shaft portions 24 (24a and 24b) that supports the movable portion 22 so as to swing the movable portion 22 around a swing axis J; and a supporting portion 23 that supports the shaft portions 24 and is formed in a frame shape surrounding the movable portion 22. In addition, the supporting portion 23 and the movable portion 22 are connected through the shaft portions 24, and are formed as one body. In addition, the glass plate 21, the movable portion 22, the shaft portions 24, and the supporting portion 23 constitute a structure portion 20 of the optical device 2. Further, the movable portion 22, the shaft portions 24, and the supporting portion 23 are formed of a synthetic resin material.

In order to drive (swing) the movable portion 22 with respect to the supporting portion 23, the optical device 2 includes: a permanent magnet 26 that is provided on the movable portion 22; a pair of coils 27 (27a and 27b) that generates magnetic field to act on the permanent magnet 26; and coil supporting portions 28 (28a and 28b) that are provided on the supporting portion 23 so as to support (hold) the respective coils 27. In addition, the permanent magnet 26, the coils 27, and the coil supporting portions 28 constitute a driving section 25 of the optical device 2.

The optical device 2 is disposed in the projector 1 so as to make, for example, the +Z axis side face the dichroic prism 110 side and the −Z axis side face the projection optical device 112 side. Here, the direction of the optical device 2 may be set to be opposite thereto.

Figure 6:
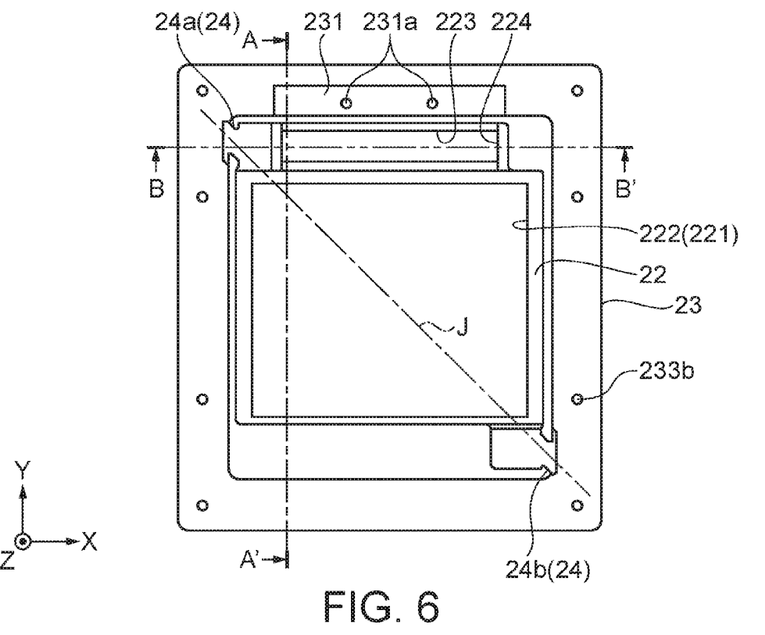
FIG. 6 is a top plan view of a supporting portion of the optical device.
Figure 7:
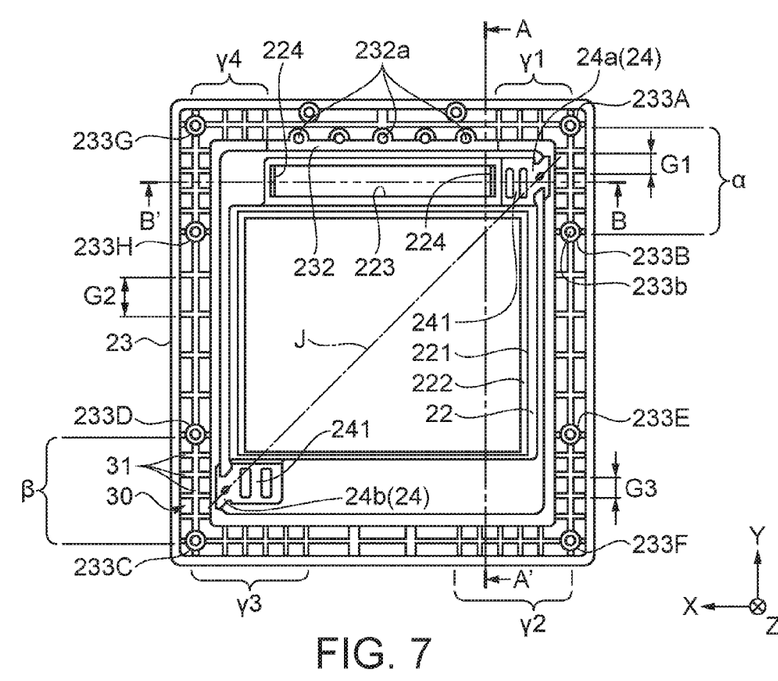
FIG. 7 is a bottom view of the supporting portion of the optical device.
Figure 8:
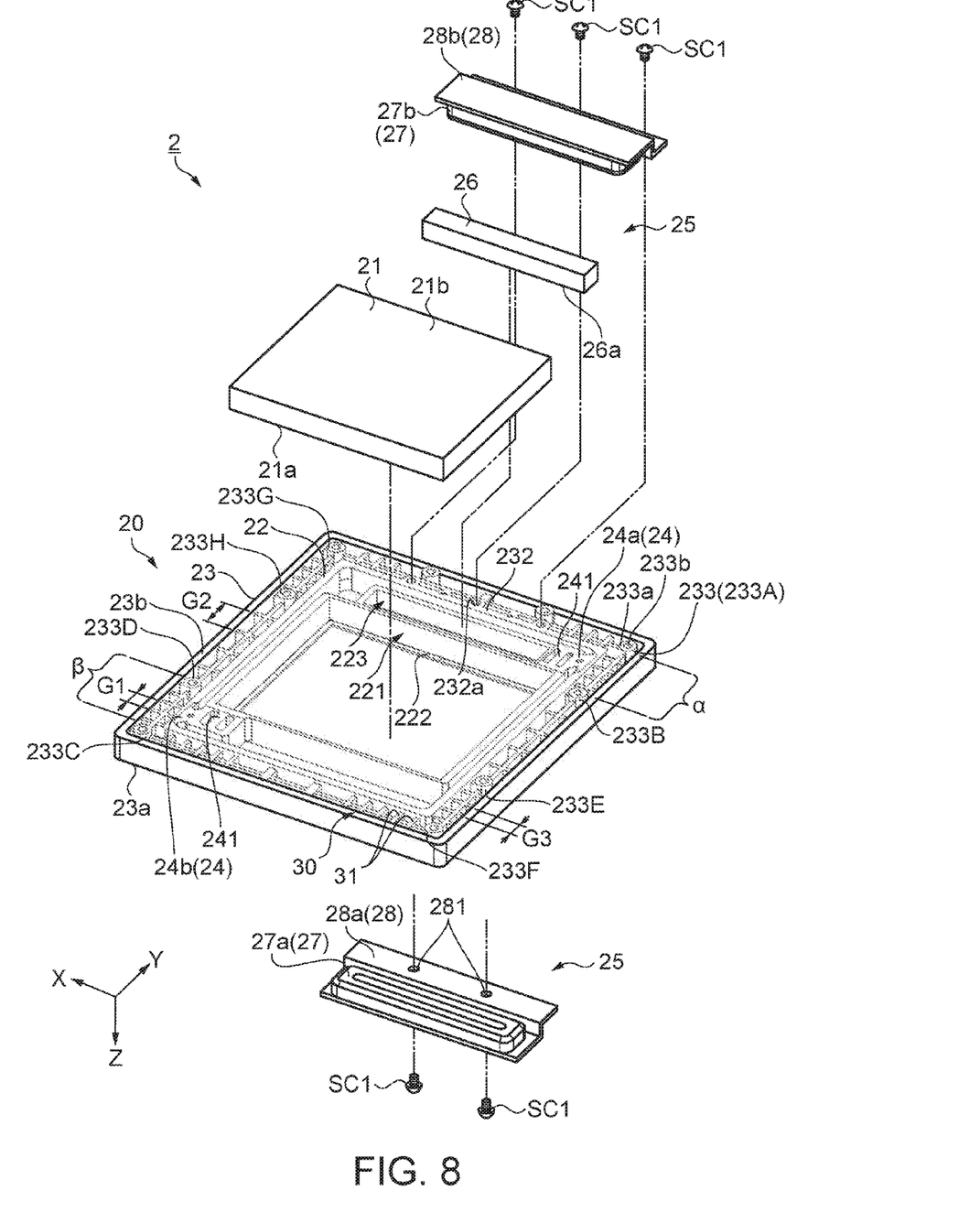
FIG. 8 is an exploded perspective view of the optical device.
Figure 9:
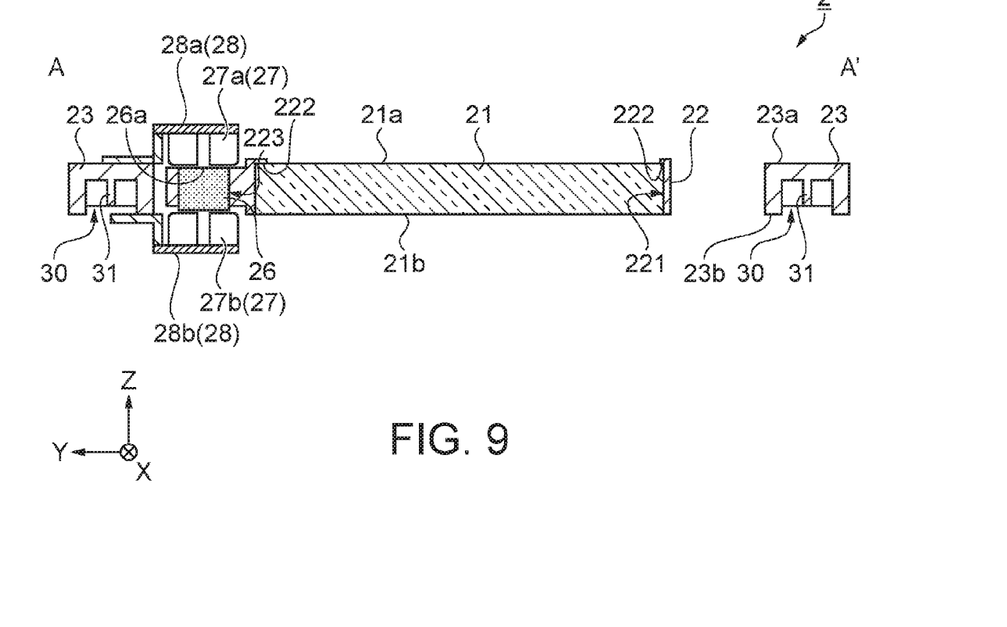
FIG. 9 is a cross-sectional view of the optical device in the Y axis direction.
Figure 10:
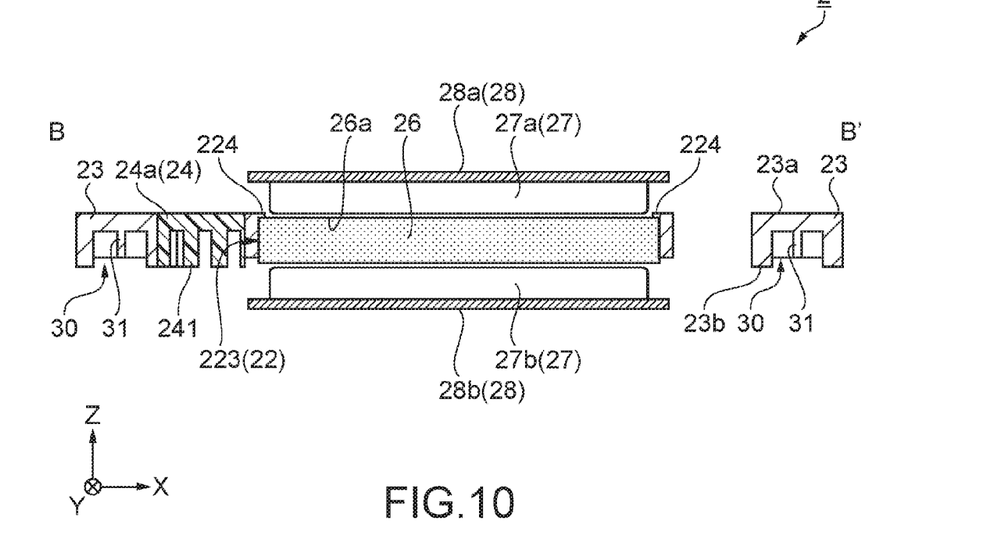
FIG. 10 is a cross-sectional view of the optical device in the X axis direction.

FIG. 6 is a top plan view of the supporting portion 23 of the optical device 2. FIG. 7 is a bottom view of the supporting portion 23 of the optical device 2. FIG. 8 is an exploded perspective view of the optical device 2. FIG. 9 is a cross-sectional view of the optical device 2 in the Y axis direction. FIG. 10 is a cross-sectional view of the optical device 2 in the X axis direction. Specifically, FIG. 9 is a cross-sectional view of the optical device 2 of FIGS. 6 and 7 taken along the line A-A', and FIG. 10 is a sectional view taken along the line B-B'. Referring to FIGS. 6 to 10, the configuration of the optical device 2 will be described in detail.

The movable portion 22 of the present embodiment is a portion that houses the glass plate 21. The movable portion 22 is formed in a rectangular plate shape, and a rectangular glass plate housing portion 221 is formed to penetrate through the movable portion 22. In the glass plate housing portion 221, a glass plate holding portion 222, which protrudes toward the inside from the edge of the +Z axis side (upper side) of the four inner peripheral faces, is formed.

In assembly of the glass plate 21 onto the movable portion 22 (glass plate housing portion 221), as shown in FIGS. 8 and 9, the rectangular glass plate 21 is inserted into the glass plate housing portion 221 from the −Z axis side (lower side), and the glass plate holding portion 222 receives and holds one principal face 21a of the glass plate 21. Thereby, the position of the glass plate 21 in the Z direction can be set. Then, by respectively bringing the outer faces of the glass plate 21 into contact with any two orthogonal inner faces of the glass plate housing portion 221, the position of the glass plate 21 in the XY direction is set. Thereafter, the glass plate 21 is bonded and fixed onto the inner faces of the glass plate housing portion 221 and the glass plate holding portion 222 through an adhesive which is not shown in the drawing.

The glass plate 21 is formed in a rectangular shape, such that one principal face 21a of the glass plate 21 constitutes an incident face onto which light is incident, and the other principal face 21b constitutes an exit surface from which light is emitted. The glass plate 21 refracts the incident image light L by tilting an incident angle of the image light L from 0°, and transmits the light. Accordingly, by changing the posture of the glass plate 21 so as to set a desirable incident angle, it is possible to control a deflection direction of the image light L or an amount of deflection of the image light L. In addition, the size of the glass plate 21 is appropriately set such that the image light L emitted from the dichroic prism 110 can be transmitted without being blocked. Further, it is preferable that the glass plate 21 is substantially colorless and transparent. Furthermore, antireflection films may be formed on the incident face (principal face 21a) and the exit surface (principal face 21b) of the image light L of the glass plate 21.

A constituent material of the glass plate 21 is not particularly limited, and it is possible to use various glass materials such as white plate glass, borosilicate glass, and quartz glass. Further, in the present embodiment, the glass plate 21 can be used as the optical portion. However, the optical portion is not particularly limited if it is formed of a material that has optical transparency and is able to refract the image light L. The optical portion may be formed of not only glass materials but also various crystalline materials such as quartz and sapphire and various resin materials such as a polycarbonate resin and an acrylic resin. Here, it is preferable that, as the optical portion, the glass plate 21 is used as in the present embodiment. Thereby, it is possible to particularly increase rigidity of the optical portion. Therefore, it is particularly possible to minimize unevenness caused by deflection of the image light L deflected through the optical portion. In addition, a planar shape of the glass plate 21 is not limited to a rectangular shape, and can be various shapes if the deflection direction of the image light L or the amount of deflection can be controlled.

In the movable portion 22 of the present embodiment, a magnet housing portion 223 is formed on the edge on the +Y axis side, on the outer side of the glass plate housing portion 221. The magnet housing portion 223 is formed in a rectangular shape, which extends along the X axis direction, so as to penetrate through the movable portion 22. In the magnet housing portion 223, magnet receiving portions 224, which protrude toward the inside from the edges on the +Z axis side (upper side) on the respective inner faces that are on the short sides and face each other, are formed.

In assembly of the permanent magnet 26 onto the movable portion 22 (magnet housing portion 223), as shown in FIGS. 8, 9 and 10, the rectangular permanent magnet 26 is inserted into the magnet housing portion 223 from the −Z axis side (lower side), and the magnet receiving portion 224 receives one face 26a of the permanent magnet 26. Thereby, the position of the permanent magnet 26 in the Z direction can be set. Then, by respectively bringing the outer faces of the permanent magnet 26 into contact with any two orthogonal inner faces of the magnet housing portion 223, the position of the permanent magnet 26 in the X axis and Y axis directions is set. Thereafter, the permanent magnet 26 is bonded and fixed onto the inner faces of the magnet housing portion 223 and the magnet receiving portion 224 through an adhesive which is not shown in the drawing.

The supporting portion 23 having a frame shape surrounding the movable portion 22 is formed around the movable portion 22. Then, the movable portion 22 and the supporting portion 23 are connected through the pair of shaft portions 24 (24a and 24b). In plan view, the shaft portions 24 are positioned at the corners of the rectangular movable portion 22 (glass plate housing portion 221) substantially diagonal to each other. In addition, the swing axis J is formed to be inclined at an angle (for example, about 45°) to connect the central point of the glass plate 21 and the centers of the shaft portions 24. The movable portion 22 swings around the swing axis J. In accordance with the swinging, the posture of the glass plate 21 changes. In particular, in the optical device 2, in plan view, the shaft portions 24 (24a, 24b) are disposed to be point-symmetric to each other with respect to the central point of the glass plate 21, and thus the movable portion 22 has favorable swinging balance. It should be noted that the angle of inclination of the swing axis J to the X axis (Y axis) is not limited to 45°.

As described above, the structure portion 20 (the movable portion 22, the supporting portion 23, and the shaft portions 24) is integrally formed. Thereby, compared with a case where the structure portion 20 is formed as separate bodies, it is possible to improve the impact resistance and long term durability in a connection region between the supporting portion 23 and the shaft portions 24 and a connection region between the shaft portions 24 and the movable portion 22.

The structure portion 20 (the movable portion 22, the supporting portion 23, and the shaft portions 24a and 24b) is formed of a material the Young's modulus of which is smaller than that of the constituent material of the glass plate 21. Such a constituent material preferably includes a resin, and more preferably includes a resin as a main component. Thereby, it is possible to effectively prevent the stress generated due to the swinging of the movable portion 22 from leading to undesirable vibration of the glass plate 21 itself. Further, the smooth movable portion 22 is able to surround the side faces of the glass plate 21. Thus, by minimizing the stress generated in the glass plate 21 when changing the posture of the glass plate 21, it is possible to minimize undesirable vibration occurring in the glass plate 21. As a result, it is possible to prevent the image, which is deflected by the glass plate 21, from being deflected in an unintended direction. Further, it is possible to suppress the change in the swing locus of the movable portion 22 relative to the ambient temperature.

In the present embodiment, as the constituent material of the structure portion 20, a synthetic resin material including polycarbonate is used. It should be noted that the synthetic resin is not particularly limited, and a resin including at least one of the following may be used: for example, polyethylene, polypropylene, silicone, polyacetal, polyamide, polyphenylene ether, polyethylene terephthalate, polybutylene terephthalate, polyarylate, polysulfone, polyether sulfone, polyphenylene sulfide, polyether ether ketone, polyimide, polyetherimide, fluorine resin, and the like.

The structure portion 20 (the movable portion 22, the supporting portion 23, and the shaft portions 24) of the present embodiment is integrally formed of a synthetic resin material including polycarbonate, and is formed through injection molding method using a mold as a forming method. It should be noted that a rib structure 30 in the supporting portion 23 and the injection molding will be described later in detail.

Next, the driving section 25 for swinging the movable portion 22 will be described.

The driving section 25 includes, as shown in FIG. 8, the permanent magnet 26 that is fixed onto the magnet housing portion 223, and the pair of coils 27 (27a and 27b) that is disposed to correspond to the permanent magnet 26 and generates magnetic field to act on the permanent magnet 26. The driving section 25 is an electromagnetic actuator. The pair of coils 27a and 27b is formed in ring shapes with the permanent magnet 26 interposed therebetween. Specifically, the coil 27a is disposed to face the permanent magnet 26 on the +Z axis side of the permanent magnet 26. Further, the coil 27b is disposed to face the permanent magnet 26 on the −Z axis side of the permanent magnet 26. In other words, the coils 27a and 27b are disposed to overlap with the permanent magnet 26 in plan view. In such a manner, by using the electromagnetic actuator as the driving section 25, it is possible to generate a force sufficient for swinging the movable portion 22 with a simple configuration. Thus, it is possible to smoothly swing the movable portion 22. In the present embodiment, the coils 27a and 27b are used as air core coils.

The permanent magnet 26 is formed in a rectangular shape (schematically rectangular rod-shaped cross section) that extends along the X axis direction, and is magnetized in the Z axis direction (the thickness direction of the glass plate 21). In addition, since the permanent magnet 26 is provided to be close to the glass plate 21, the permanent magnet 26 can be disposed to be close to swing axis J, and it is possible to reduce the moment of inertial of the movable portion 22. Thus, it is possible to more smoothly swing the movable portion 22.

The permanent magnet 26 is not particularly limited, and for example, it is possible to use a neodymium magnet, a ferrite magnet, a samarium-cobalt magnet, an alnico magnet, or the like.

The coils 27a and 27b each corresponds to the permanent magnet 26, and is provided to extend in the X axis direction. Further, the coils 27a and 27b each is disposed to be separated by a predetermined distance from the permanent magnet 26. By providing the pair of coils 27 with the permanent magnet 26 interposed therebetween, the magnetic field to act on the permanent magnet 26 is generated from both sides of the permanent magnet 26. Thus, it is possible to more smoothly swing the movable portion 22.

Here, a method of providing the coils 27 on the supporting portion 23 will be described with reference to FIG. 8.

The coils 27 are supported by the coil supporting portions 28 for supporting the coils 27, and the coil supporting portions 28 are provided by screwing onto the supporting portion 23.

The coil supporting portions 28 include a coil supporting portion 28a that supports the coil 27a, and a coil supporting portion 28b that supports the coil 27b. Both of the coil supporting portions 28 have substantially the same shapes, and the shapes are slightly different in terms of the fixed positions in a case where those are fixed onto the supporting portion 23. In addition, the constituent material of the coil supporting portions 28 is preferably a material which has a thermal conductivity larger than that of the supporting portion 23 and is non-magnetic. For example, the material includes aluminum, copper, silver, non-magnetic stainless steel, and the like.

The coil supporting portion 28a is formed to extend in an extension direction of the coil 27a and be bent like a crank shape in a cross-sectional view thereof. The coil 27a is provided on one face of the coil supporting portion 28a, and is fixed through an adhesive or the like. Further, two insertion holes 281, which are for fixing screws and into which screws are inserted, are provided on the other face.

In a case where the coil 27a is provided on the supporting portion 23, the coil supporting portion 28a, on which the coil 27a is fixed, is fixed onto the supporting portion 23. Specifically, the direction of the coil supporting portion 28a is set such that the coil 27a faces the permanent magnet 26 side, and the other face is placed on a mounting face 231 (refer to FIG. 6) of the supporting portion 23. Next, a screw SC1 is inserted into each insertion hole 281, and is fixed by being screwed into a screw hole 231a (refer to FIG. 6) which is formed on the mounting face 231 and is not threaded as a female screw.

The coil supporting portion 28b and the coil supporting portion 28a have the substantially the same configuration, and the coil 27b is fixed through an adhesive similarly. Then, the direction of the coil 27b is set, and the other face is placed on a mounting face 232 (refer to FIGS. 7 and 8) which is formed on the supporting portion 23. Next, the screws SC1 are inserted into three insertion holes (not shown in the drawing) of the coil supporting portion 28b, and are fixed by being screwed into screw holes 232a (refer to FIGS. 7 and 8) which are formed on the mounting face 232 and are not threaded as female screws.

Through the above-mentioned assembly, the optical device 2 is completed.

Next, the rib structure 30 of the supporting portion 23 will be described.

The supporting portion 23 of the present embodiment includes the shaft portions 24 and the movable portion 22, and is integrally formed of a synthetic resin material. The supporting portion 23 has the rib structure 30 in which a plurality of ribs 31 are connected on a −Z axis side face 23b. In addition, there are no ribs on a +Z axis side face 23a. Accordingly, the rib structure 30 of the present embodiment is provided on one side face (face 23b) of the supporting portion 23. In other words, the rib structure 30 is formed on a side opposite to the +Z axis side face 23a. That is, the rib structure 30 is formed on one face 23b of the faces 23a and 23b which are orthogonal to a direction (Z axis direction) in which light is incident. Further, the plurality of ribs 31 extends from the outer periphery of the supporting portion 23 to the inner periphery thereof. Furthermore, the rib structure 30 has a structure in which the ribs 31 extend in parallel with the outer periphery between the outer periphery and the inner periphery of the supporting portion 23 and the plurality of ribs 31 is connected at substantially the center between the outer periphery and the inner periphery of the supporting portion 23. Further, the ribs 31 may have a structure in which the ribs 31 are inclined with respect to the outer periphery or the inner periphery of the supporting portion 23. In addition, by using the rib structure 30, apart other than the ribs 31 is formed as rooms. As a result, it is possible to achieve reduction in weight of the optical device 2.

In addition to the rib structure 30, a plurality of (10 in the present embodiment) dowels 233 is formed. In each dowel 233, the insertion hole 233b for screwing the optical device 2 onto a part (not shown in the drawing) in which the projection optical device 112 is provided is formed. The optical device 2 of the present embodiment is fixed onto the projection optical device 112. The dowels 233 are used for the fixing. Specifically, dowel faces 233a of the dowels 233 are brought into tight contact with an attachment portion of the projection optical device 112. Thereafter, screws (not shown in the drawing) are inserted into the insertion holes 233b from the +Z axis side, and are threadedly fixed onto screw holes (not shown in the drawing) which are formed on the attachment portion.

The rib structure 30 of the present embodiment is formed in a lattice shape in which the plurality of ribs 31 having a function for reinforcing the supporting portion 23 is connected. The ribs 31 of the present embodiment are provided such that distances between the ribs 31 are set to be short in a region for ensuring rigidity and are set to be long in the other region. Thereby, in a main portion for ensuring rigidity, a distance G1 between the ribs 31 is short, and in a region other than the main portion, a distance G2 between the ribs 31 is long. Further, a thickness of each rib 31 in a plane direction is small in the main portion for ensuring rigidity, and is large in the region other than the main portion. Also by changing the thickness of each rib 31 as described above, it is possible to make the rib structure dense in the main portion. Thus, it is possible to achieve reduction in weight, and it is possible to ensure rigidity.

The main portion in the present embodiment is a connection region in which the supporting portion 23 and the shaft portions 24 are connected, that is, a region in which the two shaft portions 24 of the supporting portion 23 are supported, or a region in which the supporting portion 23 overlaps with the swing axis J in plan view. In addition, a region of the supporting portion 23, which supports the shaft portions 24a, is hereinafter referred to as a supporting region α. Further, a region of the supporting portion 23, which supports the shaft portions 24b, is hereinafter referred to as a supporting region β.

In the present embodiment, specifically, the supporting region α (supporting region β) for the shaft portion 24a (shaft portion 24b) is set as a region between two dowels 233 which are formed at a position with the connection part of the shaft portions 24 interposed therebetween. In the present embodiment, as shown in FIG. 8, a region between the dowels 233A and 233B is set as the supporting region α. Further, a region between the dowels 233C and 233D is set as the supporting region β. In the supporting regions α and β, the distance G1 between the ribs 31 is formed to be shorter than the distance G2 between the ribs 31 in the other region.

The dowels 233A and 233B and the dowels 233C and 233D are respectively positioned at substantially diagonal corners of the supporting portion 23. Further, also between the two dowels 233 provided at the other corners of the supporting portion 23, in a manner similar to the supporting regions α and β, the distance G3 between the ribs 31 is formed to shorter than the distance G2 between the ribs 31 in the other region. The dowels 233 are referred to as a dowel 233E, a dowel 233F, a dowel 233G, and a dowel 233H.

Thereby, in the supporting region α (region between the dowels 233A and 233B) and the supporting region β (region between the dowels 233C and 233D), it is possible to improve rigidity as compared with the surroundings. Further, also between the dowels 233E and 233F, and between the dowels 233G and 233H, it is possible to improve rigidity as compared with the surroundings. Thereby, by ensuring rigidity of the supporting regions α and β, it is possible to ensure rigidity of the four corners of the supporting portion 23, and it is possible to ensure rigidity and a shape of the supporting portion 23 itself having a frame shape.

The ribs 31 are formed on the supporting portion 23 in which the shaft portions 24a (shaft portions 24b) are not connected, and in the corner portions, the distance between the ribs 31 is formed to be shorter than the distance between the ribs 31 in the other region.

In the present embodiment, as shown in FIG. 7, in the +X axis side periphery (region γ1) of the dowel 233A, the +X axis side periphery (region γ2) of the dowel 233F, the −X axis side periphery (region γ3) of the dowel 233C, and the −X axis side periphery (region γ4) of the dowel 233G in the corner portions, the distance between the ribs 31 is formed to be shorter than the distance G2 between the ribs 31 in the other region.

In the present embodiment, also in the shaft portions 24, ribs 241 are provided. In the present embodiment, the ribs 241 are formed to be parallel with the long side of the supporting portion 23. The ribs 241 may be formed to be parallel with the short side of the supporting portion 23 and be inclined thereto. Thereby, reduction in weight of the shaft portions 24 is achieved, and necessary rigidity is ensured. Specifically, in plan view, the ribs 241 of the present embodiment are formed to extend in a direction orthogonal to the swing axis J. By using the ribs 241, rigidity of the shaft portions 24 when the movable portion 22 swings (the shaft portions 24 swing) is easily ensured, compared with a case where the ribs are formed to be parallel with the swing axis J.

In the present embodiment, the supporting portion 23 is formed through the injection molding using the mold. Thus, by using the rib structure 30, it is possible to ensure rigidity of the supporting portion 23, and it is possible to prevent errors in molding such as shrinkage from occurring on the face 23a of the supporting portion 23. As a result, moldability or a mold structure of the mold is improved, and a cycle time of the molding is improved.

According to the above-mentioned embodiment, the following effect can be obtained.

The optical device 2 of the present embodiment has the rib structure 30 in which the ribs 31 are connected in the supporting portion 23. Thereby, the supporting portion 23 is formed with a thickness for enhancing rigidity through the rib structure 30. As a result, it is possible to achieve reduction in weight of the optical device 2, and it is possible to ensure rigidity.

In the optical device 2 of the present embodiment, in the supporting portion 23, the rib structure 30 is provided on one side face (face 23b) of the supporting portion 23. Thereby, when the supporting portion 23 is formed, in a case of using the injection molding, it is possible to improve moldability and the mold structure of the mold.

In the optical device 2 of the present embodiment, the rib structure 30 is configured such that the distance G1 between the ribs 31 in the supporting regions α and β, which support the shaft portions 24 of the supporting portion 23, is shorter than the distance G2 between the ribs 31 in the other region of the supporting portion 23. Thereby, as compared with the other region, it is possible to improve rigidity, and it is possible to ensure rigidity of main portions for swinging.

In the optical device 2 of the present embodiment, the movable portion 22, the shaft portions 24, and the supporting portion 23 are integrally formed of a synthetic resin material (polycarbonate). Thereby, it is possible to achieve reduction in weight, and it is possible to ensure rigidity. Further, since it is possible to perform molding in the injection molding method, it is possible to improve mass-production capability. Furthermore, the supporting portion 23 has the rib structure 30, and thus it is possible to prevents defects such as shrinkage from being caused by molding, and it is possible to improve molding quality.

The optical device 2 of the present embodiment includes the permanent magnet 26 that is provided on the movable portion 22; the pair of coils 27 that generates magnetic field to act on the permanent magnet 26; and the coil supporting portions 28 that support the coils 27. The coil supporting portions 28 support the coils 27 such that the coils 27 face the permanent magnet 26, and are fixed onto the supporting portion 23. Thereby, it is possible to smoothly swing the movable portion 22.

The optical device 2 of the present embodiment transmits image light L through the glass plate 21, and is swingable through the shaft portions 24. Thereby, by using refraction (deflection) of the image light L caused by swinging of the glass plate 21, it is possible to shift the optical axis of the image light L.

Since the projector 1 of the present embodiment has the optical device 2, it is possible to achieve reduction in weight, and it is possible to obtain display characteristics excellent in high resolution.

The projector 1 of the present embodiment deflects the optical path of the incident image light L through the optical device 2 so as to shift the positions of the pixels displayed by irradiation of the image light L. Thereby, it is possible to virtually improve resolution.

Second Embodiment

Figure 11:
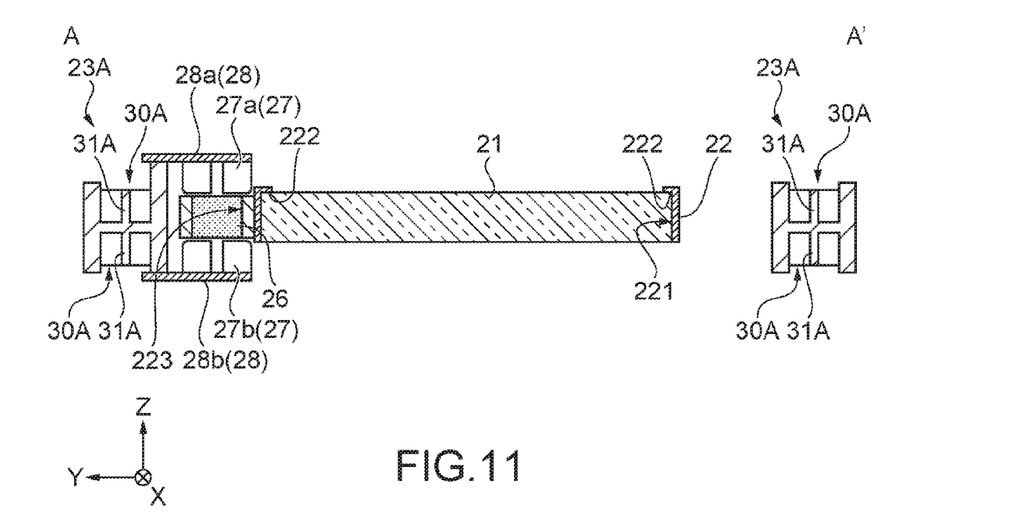
FIG. 11 is a cross-sectional view of an optical device according to a second embodiment in the Y axis direction.
Figure 12:
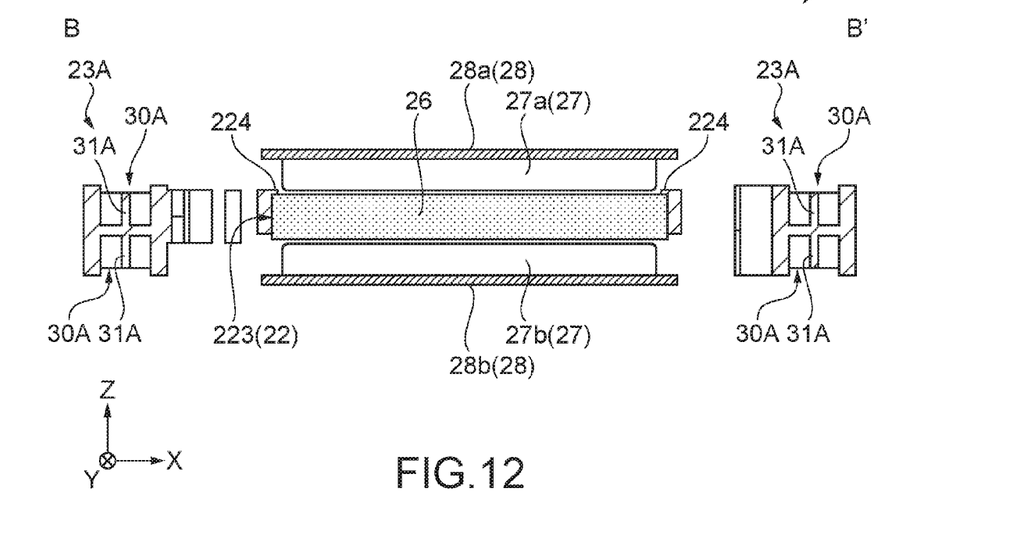
FIG. 12 is a cross-sectional view of the optical device in the X axis direction.

FIG. 11 is a cross-sectional view of an optical device 2A according to a second embodiment in the Y axis direction. FIG. 12 is a cross-sectional view of the optical device 2A in the X axis direction. In addition, FIGS. 11 and 12 are cross-sectional views corresponding to FIGS. 9 and 10 of the first embodiment. Referring to FIGS. 11 and 12, a configuration of the optical device 2A of the present embodiment will be described.

The optical device 2A of the present embodiment has a different rib structure 30A, compared with the optical device 2 of the first embodiment. The other configuration is substantially the same as that of the optical device 2 of the first embodiment. Components similar to those of the first embodiment are represented by like reference signs and numerals, and a description of structures and operations of the components will be omitted.

The optical device 2A of the present embodiment has a rib structure 30A on both sides of the supporting portion 23A. The rib structure 30A is formed in a lattice shape in which the ribs 31A the same as those of the first embodiment are connected on both sides thereof. In other words, the ribs 31A are formed on both the +Z axis side and the −Z axis side. That is, the rib structure 30A is formed on both faces 23a and 23b of the faces 23a and 23b which are orthogonal to the direction (Z axis direction) in which light is incident.

According to the second embodiment, it is possible to obtain the same effect as that of the optical device 2 of the first embodiment and the projector 1 as the image display apparatus using the optical device 2.

It should be noted that the invention is not limited to the above-mentioned embodiments, and can be modified into various forms without departing from a technical scope of the invention. Modification examples will be hereinafter described.

In the optical device 2 of the first embodiment, the distance G1 between the ribs 31 in regions (supporting regions α and β), which support the shaft portions 24 of the supporting portion 23, is shorter than the distance G2 between the ribs 31 in the other region. Further, the supporting region α is between the dowels 233A and 233B. Furthermore, the supporting region β is between the dowels 233C and 233D. However, since the regions are preferably within a range in which rigidity having no effect on swinging of the shaft portions 24 can be provided, an arbitrary range can be set to be a range in which necessary rigidity can be ensured. However, it is preferable that the range includes the connection part between the shaft portions 24 and the supporting portion 23. It is the same for the second embodiment.

In the optical device 2 of the first embodiment, one principal face 21a of the glass plate 21 forms an incident face onto which light is incident, and the other principal face 21b forms an exit surface from which light is emitted. However, the incident face may be the principal face 21b, and the exit surface may be the principal face 21a. It is the same for the second embodiment.

In the first embodiment, as an example of the image display apparatus, the projector 1 has been employed and described. However, not only the projector 1 but also an image display apparatus such as a head mount display (HMD) or a head up display (HUD) may be used. The HMD is an apparatus that is used by being mounted to a user and assists the user to view a landscape on which image light is superimposed. The HUD is an apparatus that is mounted on, for example, a vehicle, and projects various kinds of information (videos) such as a speed per hour, a time period, and a travel distance to a driver through a front glass. Otherwise, the invention can be applied to a printer, a scanner, and the like.

In the first embodiment, the optical portion (glass plate 21) has optical transparency, and the optical device 2 used as a pixel shift device has been described, but the application of the optical device is not limited to this. For example, a light incident portion of the optical portion has light reflectivity, and may be used as a light scanner that scans light, which is reflected on the light incident portion, by swinging the movable portion.

In the first embodiment, a single driving section 25 is provided. However, the invention is not limited to this, and for example, a single driving section 25 of the present embodiment may be additionally provided on the edge of the −Y axis side of the movable portion 22 so as to be point-symmetric to the driving section 25 of the present embodiment with respect to the center of the glass plate 21. It is the same for the second embodiment.

The entire disclosure of Japanese Patent Application No. 2015-231414, filed Nov. 27, 2015 is expressly incorporated by reference herein.

What is claimed is:

1. An optical device comprising:
an optical plate that is in a rectangular shape and that has a light incident face onto which light is incident;
a movable frame that is fixed to a periphery of the optical plate;
an outer frame that is provided adjacent to a periphery of the movable frame so that the periphery of the movable frame and an inner surface of the outer frame is spaced apart from each other; and
shaft fixtures that opposite corner areas of the moveable frame to opposite corner areas of the outer frame, respectively, the optical plate and the movable frame being swingably connected to the outer frame via the shaft fixtures around a swing axis,
wherein the outer frame has a rib structure which is configured with connecting ribs.

2. The optical device according to claim 1,
wherein the rib structure is provided on a single surface of the outer frame.

3. The optical device according to claim 1,
wherein the rib structure is provided on both surfaces of the outer frame.

4. The optical device according to claim 1,
wherein the outer frame has first and second parts, and the first part is closer to one of the shaft fixtures than the second part, and
a distance between adjacent ribs in the first part is shorter than a distance between adjacent ribs in the second part.

5. The optical device according to claim 1,
wherein the movable frame, the shaft fixtures, and the outer frame configure a monolithic body, and
the monolithic body includes a synthetic resin material.

6. The optical device according to claim 1, further comprising:
a permanent magnet that is provided on the movable frame;
a coil that generates magnetic field to act on the permanent magnet; and
a coil support that supports the coil so that the coil faces the permanent magnet,
wherein the coil support is fixed to the outer frame.

7. The optical device according to claim 1,
wherein the optical plate transmits the light.

8. An image display apparatus comprising:
the optical device according to claim 1; and
display that shows an image based on the light.

9. An image display apparatus comprising:
the optical device according to claim 2; and
a display that shows an image based on the light.

10. An image display apparatus comprising:
the optical device according to claim 3; and
display that shows an image based on the light.

11. An image display apparatus comprising:
the optical device according to claim 4; and
a display that shows an image based on the light.

12. An image display apparatus comprising:
the optical device according to claim 5; and
a display that shows an image based on the light.

13. An image display apparatus comprising:
the optical device according to claim 6; and
a display that shows an image based on the light.

14. An image display apparatus comprising:
the optical device according to claim 7; and
a display that shows an image based on the light.

15. The image display apparatus according to claim 8,
wherein when the optical plate moves with respect to the shaft fixtures, an optical path of the light incident on the light incident face of the optical plate so that positions of pixels displayed through irradiation of the light are shifted.

16. An optical device comprising:
an optical member that has a light incident face onto which light is incident;
a movable member that is swingable while supporting the optical member;
a shaft member that supports the movable member so as to swing the movable member around a swing axis; and
a supporting member that supports the shaft member,
wherein the supporting member has a rib structure which is formed by connecting ribs, and
the rib structure is provided on both surfaces of the supporting member.

17. The optical device according to claim 16,
wherein the movable member, the shaft member, and the supporting member are formed as one body so as to include a synthetic resin material.

18. The optical device according to claim 16, further comprising:
a permanent magnet that is provided on the movable member;
a coil that generates magnetic field to act on the permanent magnet; and
a coil supporting member that supports the coil,
wherein the coil supporting member supports the permanent magnet by making the coil face the permanent magnet, and is fixed onto the supporting member.

19. An image display apparatus comprising:
the optical device according to claim 16; and
a display that shows an image based on the light,
wherein by deflecting an optical path of the light incident onto the optical device, positions of pixels displayed through irradiation of the light are shifted.

20. An optical device comprising:
an optical member that has a light incident face onto which light is incident;
a movable member that is swingable while supporting the optical member;
a shaft member that supports the movable member so as to swing the movable member around a swing axis; and
a supporting member that supports the shaft member,
wherein the rib structure is formed such that a distance between ribs in a region, in which the shaft member of the supporting member is supported, is shorter than a distance between ribs in the other region of the supporting member.

* * * * *